United States Patent
Feidieker et al.

(10) Patent No.: US 11,804,760 B2
(45) Date of Patent: Oct. 31, 2023

(54) METHOD FOR PRODUCING AN ARRANGEMENT FOR A PLUG-IN COIL OF AN ELECTRIC MACHINE, GRIP APPARATUS AND MANUFACTURING

(71) Applicant: Aumann AG, Beelen (DE)

(72) Inventors: Georg Feidieker, Varendorf (DE); Bernd Radtke, Selm (DE); Gerold Specht, Harsewinkel (DE); Jan Felix Woerdehoff, Bueren (DE)

(73) Assignee: Aumann AG, Beelen (DE)

( * ) Notice: Subject to any disclaimer, the term of this patent is extended or adjusted under 35 U.S.C. 154(b) by 563 days.

(21) Appl. No.: 16/755,199

(22) PCT Filed: Oct. 11, 2018

(86) PCT No.: PCT/DE2018/100836
§ 371 (c)(1),
(2) Date: Apr. 10, 2020

(87) PCT Pub. No.: WO2019/072340
PCT Pub. Date: Apr. 18, 2019

(65) Prior Publication Data
US 2021/0351676 A1    Nov. 11, 2021

(30) Foreign Application Priority Data
Oct. 11, 2017   (DE) .................... 10 2017 123 670.8

(51) Int. Cl.
*H01F 7/06* (2006.01)
*H02K 15/06* (2006.01)
(Continued)

(52) U.S. Cl.
CPC ............. *H02K 15/063* (2013.01); *H02K 3/12* (2013.01); *H02K 3/28* (2013.01); *H02K 3/505* (2013.01);
(Continued)

(58) Field of Classification Search
CPC ............. H02K 15/0414; H02K 15/045; H02K 15/063; H02K 15/064; H02K 15/085; H02K 3/12; H02K 3/28; H02K 3/505
See application file for complete search history.

(56) References Cited

U.S. PATENT DOCUMENTS 2,631,362 A   3/1953 Todd
9,444,315 B2 * 9/2016 Saito .................... H02K 15/085
(Continued)

FOREIGN PATENT DOCUMENTS

| GB | 644761 A    | 10/1950 |
|----|-------------|---------|
| JP | 2003153478 A | 5/2003  |
| JP | 2004072839 A | 3/2004  |

OTHER PUBLICATIONS

International Search Report (English and German) issued in International Application No. PCT/DE2018/100836, dated Jan. 25, 2019; ISA/EP.

*Primary Examiner* — Paul D Kim
(74) *Attorney, Agent, or Firm* — Harness, Dickey & Pierce, P.L.C.

(57) ABSTRACT

A method is presented for producing an arrangement for a plug-in coil of an electric machine, having the following steps: providing an arrangement of coil elements, which each are embodied as a rod-shaped coil element and are pre-aligned with one another; gripping the arrangement of coil elements by way of a grip apparatus, wherein the grip apparatus grips the arrangement of coil element by way of a first grip device in a first grip plane and by way of a second grip device in a second grip plane which is arranged beneath the first grip plane and at a distance therefrom; holding the arrangement of coil elements by way of the grip apparatus and inserting legs of the coil element into allocated grooves of a core; and releasing the grip apparatus from the arrangement of coil elements.

13 Claims, 10 Drawing Sheets

(51) Int. Cl.
*H02K 3/12* (2006.01)
*H02K 3/28* (2006.01)
*H02K 3/50* (2006.01)
*H02K 15/04* (2006.01)
*H02K 15/085* (2006.01)

(52) U.S. Cl.
CPC ....... *H02K 15/045* (2013.01); *H02K 15/0414* (2013.01); *H02K 15/085* (2013.01)

(56) References Cited

U.S. PATENT DOCUMENTS 9,871,430 B2 * 1/2018 Ohno .................... H02K 15/064
11,146,155 B2 * 10/2021 Ueno ................... H02K 15/067

* cited by examiner

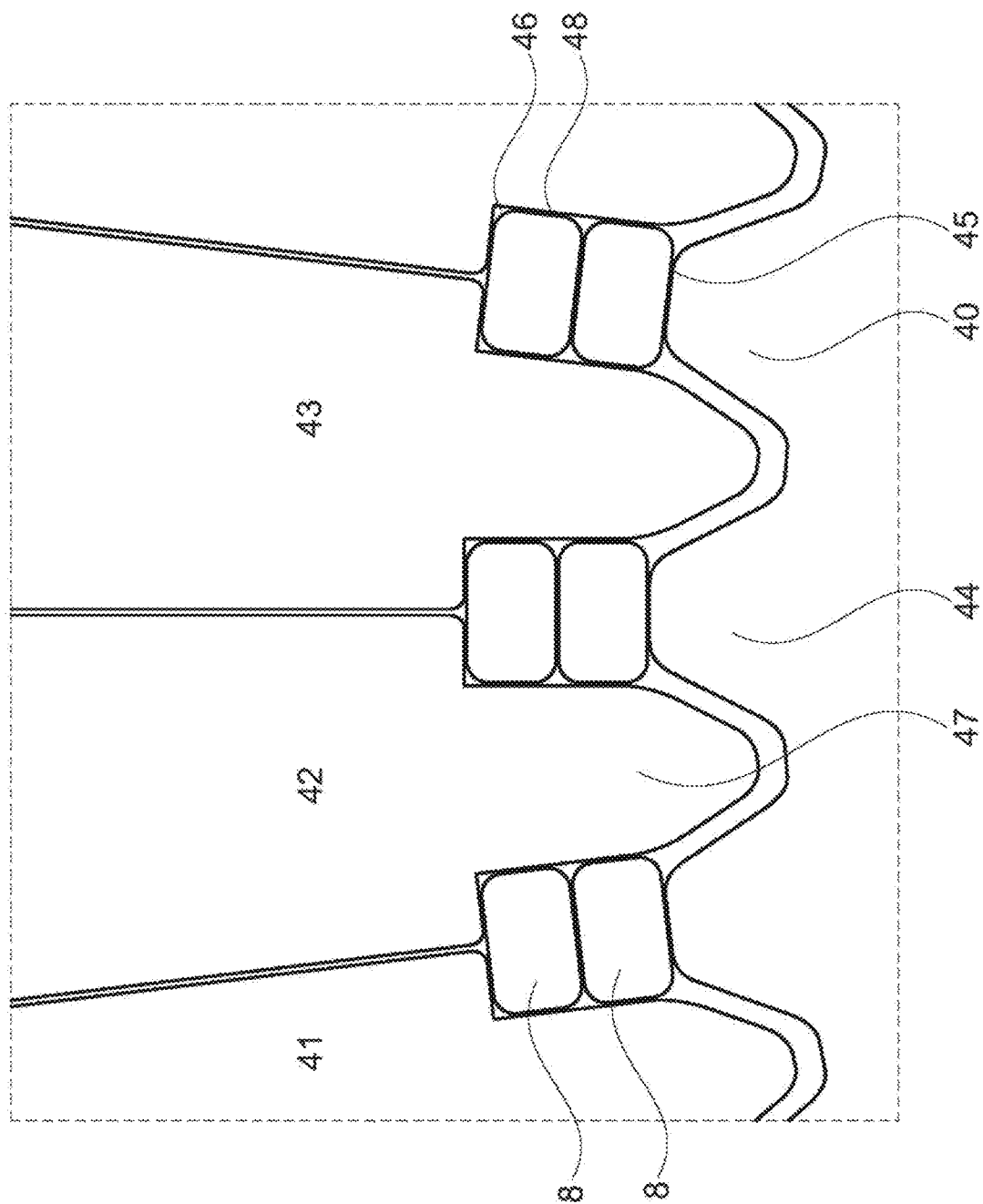

METHOD FOR PRODUCING AN ARRANGEMENT FOR A PLUG-IN COIL OF AN ELECTRIC MACHINE, GRIP APPARATUS AND MANUFACTURING

CROSS-REFERENCE TO RELATED APPLICATIONS

This application is a 371 U.S. National Stage of International Application No. PCT/DE2018/100836, filed on Oct. 11, 2018, which claims priority to German Application No. 10 2017 123 670.8, filed on Oct. 11, 2017. The entire disclosures of the above applications are incorporated herein by reference.

The invention relates to a method for producing an arrangement for a plug-in coil of an electric machine, a grip apparatus, as well as a manufacturing apparatus.

BACKGROUND

Such a method is known, for example, from document WO 2015/055445 A2. An arrangement for a plug-in coil of an electric or electrodynamic machine is produced for a stator or a rotor. Rod-shaped or hairpin-shaped coil elements are initially pre-aligned or pre-positioned in order to provide a basket-like, self-contained arrangement of the coil elements. Legs of the coil elements of the pre-positioned arrangement are then inserted into allocated grooves of a core, in order to finally produce a coil winding.

SUMMARY

It is the object of the invention to provide improved technologies in connection with the production of an arrangement for a plug-in coil of an electric machine, be it in connection with a rotor or a stator, which support a flexible and material-saving production.

To solve the object, a method for producing an arrangement for a plug-in coil of an electric machine according to independent claim 1 is provided. Independent claims 12 and 14 relate to a grip apparatus for gripping and holding an arrangement of pre-positioned coil elements for a plug-in coil of an electric machine as well as a manufacturing apparatus for producing an arrangement for a plug-in coil of an electric machine. Embodiments are the subject of dependent claims.

According to one aspect, a method for producing an arrangement for a plug-in coil of an electric machine is created. The method comprises the following steps: providing an arrangement of coil elements, which are each provided as a rod-shaped coil element and are pre-positioned or pre-aligned relative to one another; gripping the arrangement of coil elements by using a grip apparatus, wherein the grip apparatus grips the arrangement of coil elements using a first grip device in a first grip plane and a second grip device in a second grip plane, which is arranged beneath e first grip plane and is arranged spaced apart therefrom; holding the arrangement of coil elements by means of the grip apparatus and inserting legs of the coil elements into allocated grooves of a core; and releasing the grip apparatus from the arrangement of coil elements.

According to a further aspect, a grip apparatus for gripping and holding an arrangement of pre-positioned coil elements for a plug-in coil of an electric machine is created, in particular for use in the method for producing the arrangement for the plug-in coil. The grip apparatus has a first grip device as well as a second grip device. The first grip device is configured to grip in a first coil plane an arrangement of coil elements, which are each provided as a rod-shaped coil element and are pre-positioned relative to one another. The second grip device is configured to grip the arrangement of coil elements in a second grip plane, which is arranged beneath the first grip plane and spaced apart therefrom. The first and the second grip device are configured to hold the arrangement of coil elements and to insert legs of the coil elements into allocated grooves of a core.

According to another aspect, a manufacturing apparatus for producing an arrangement for a plug-in coil of an electric machine is provided. The manufacturing apparatus has a pre-positioning unit which, to form an arrangement of coil elements, is configured to receive the coil elements for pre-positioning or pre-alignment. The manufacturing apparatus provides an insertion unit configured to receive a core for inserting legs of the coil elements of the arrangement of coil elements into grooves of the core. The manufacturing apparatus furthermore has a grip apparatus configured to remove the arrangement of coil elements from the pre-positioning unit, to pass it to the insertion unit, and to hold and guide it there during the insertion in into the grooves of the core.

With the help of the proposed technologies, it is made possible to receive (to grip and to hold) the coil elements, which were previously positioned or aligned relative to one another, in an efficient, material-saving and geometrically defined manner, in order to arrange the self-contained arrangement of coil elements on the core for the plug-in coil of the electric or electrodynamic machine, by inserting or threading legs of the coil elements into allocated grooves of the core. Herein, the grip device can (additionally) also be pre-positioning or pre-aligning during the gripping.

Thereafter, the grip apparatus can let go of the arrangement of coil elements, whereupon the arrangement with core and inserted coil elements can be further processed, in particular for machining leg ends, which protrude from the grooves of the core on the side located opposite the insertion side and which can for example be crossed, welded together, and be provided with a switching ring in the further course of production.

The pre-positioning or pre-alignment of the coil elements with the self-contained arrangement of coil elements can take place in a variety of ways. The technology proposed herein supports the maintaining and securing of the pre-positioning of the coil elements in the arrangement, which facilitates the insertion or threading of the legs of the coil elements into the grooves of the core.

The rod-shaped coil elements can also be referred to as hairpin-shaped or u-shaped coil elements.

In one exemplary embodiment, the self-contained arrangement of coil elements can be formed so as to correspond to a basket-like arrangement after the pre-positioning.

The first grip device can grip the arrangement of coil elements in an upper end section. The second grip device can grip the arrangement of coil elements in a lower end section, for example in the area of the leg ends of the coil elements, in particular during a possible transport of the arrangement of coil elements from the location of the pre-positioning to the location of the insertion or threading of the legs of the coil elements into the allocated grooves of the core.

With respect to their relative position to one another, the coil elements can, after the pre-alignment, essentially correspond to the arrangement in which the coil elements are then arranged after the insertion into the grooves of the core. The grip apparatus can be configured to secure or to maintain this pre-positioning, which then essentially corresponds to the end position of the coil elements in the core. A further or supplementary positioning or alignment of the coil elements after the gripping with the grip apparatus can be saved thereby. A wire cross section can be, for example, polygonal or round.

The coil elements can consist of a wire material, for example copper, and can optionally have an outer insulating layer.

During the gripping of the arrangement of coil elements, an initial grip distance between the first and the second grip plane can be changed to a grip end distance which is greater than the initial grip distance; and the legs of the coil elements, when increasing the grip distance between the first and the second grip plane, can be clamped by using the first grip device and can be guided, in a non-clamping manner and so as to support the pre-positioning relative to one another, in the second grip device. When increasing the grip distance between the first and the second grip plane, for the formation of which the first and the second grip device are moved relative to one another, in particular in the vertical direction, it can be provided that the first and the second grip device then lastly grip the arrangement of coil elements after the formation of the grip distance in an upper and a lower end section. The non-clamping reception of the coil elements by the second grip device makes it possible, for example, to remove or unthread the legs of the coil elements from allocated receptacles of the apparatus for pre-positioning (pre-positioning unit), without losing the pre-positioning of the coil elements, which is achieved by a supportive guidance with the help of the second grip device.

The legs of the coil elements can be clamped using the second grip device, when the grip end distance is set. In the alternative, it can be provided that the legs of the coil elements are not clamped even after reaching the grip distance, but are (only) guided narrowly with the help of the second grip device, so that the pre-positioning is essentially maintained. This non-clamped state can also be maintained during a transport of the arrangement of pre-positioned coil elements to the location of the insertion of the legs into the grooves of the core, even if the legs of the coil elements can herein be clamped in the alternative.

During the insertion of the leg ends of the coil elements into the allocated apertures of the core, an initial insertion distance between the first and the second grip plane can be changed, and the legs of the coil elements can be clamped by means of the first grip device when changing the insertion distance and guided in a non-clamping manner and so as to support the pre-positioning relative to one another in the second grip device. In this manner, during the insertion or threading into the allocated grooves of the core, the legs are guided by means of the second grip device, which is arranged beneath the first grip device, in such a way that the pre-positioning is essentially maintained. The feed for the insertion of threading of the legs in the grooves is transferred to the coil elements with the help of the first grip device.

The grip apparatus can be released from the arrangement of coil elements when the insertion distance is reached.

The first and/or the second grip device can hold the coil elements by means of clamping or grip elements, herein optionally in a clamping manner, which, during the gripping, are arranged on the outer and/or inner side with respect to the arrangement of coil elements. In the alternative or in addition, one or several gripping or holding elements can be provided, by means of which the coil elements are gripped or held in a non-clamped manner. In the case of this or other embodiments, the clamping/gripping elements of the grip devices can have one or several clamping or gripping jaws (holding jaws). For example, clamping and/or gripping jaws can be provided on three sides. When gripping, the clamping and/or the gripping elements of the first and/or of the second grip device can be operated synchronously by means of one or several actuators, optionally by transferring the synchronous drive movement to the clamping and/or the gripping elements via one or several guide plates.

The first and/or the second grip device can hold the coil elements by means of clamping or gripping elements, herein optionally clamp them, which are formed in a circumferentially continuous manner with respect to the arrangement of coil elements.

The first and/or the second grip device can hold the coil elements by means of clamping or gripping elements, herein optionally in a clamp them, with respect to which sections of the coil elements, which are clamped/gripped in a non-clamping manner, are arranged in allocated receptacles of the clamping elements after the clamping/non-clamping gripping.

The grip apparatus can grip the arrangement of coil elements in such a way that the first grip plane and the second grip plane are arranged in the area of the legs of the coil elements.

The insertion of the coil elements into the grooves of the core can be supported using allocated insertion aids, which are inserted into the grooves. The allocated insertion aids, which are formed, for example, with insertion lances, can be inserted into the grooves from an opposite side during the insertion or threading of the legs of the coil elements in the grooves, so as to support the leg ends of the coil elements, when they advance bit by bit in the grooves, wherein the insertion aids are pulled out of the grooves again to the same extent as the legs of the coil elements are inserted or threaded into the same. One or several insertion lances can be used for each groove, for example a number of insertion lances which corresponds to the number of legs of coil elements in the allocated groove.

Independently of the concrete design of the grip apparatus, the insertion aid can be provided with grip apparatuses of different types. Hereby, a method for introducing a coil element, which is provided with a rod or hairpin shape, in a groove of a core for a plug-in coil of an electric or electrodynamic machine can be provided, in which an insertion aid, for example an insertion lance, is inserted into the groove from one side of the core, be it encompassing the groove in its entire or partial length, and in which a leg of the coil element, which is inserted into the groove from the opposite side of the core, is guided using the insertion aid during insertion into the groove. It can be provided that opposite ends of insertion aid and leg of the coil element are arranged so as to at least temporarily abut against one another during the insertion of the coil element.

In a possible embodiment, one or several insertion aids or elements, which can be provided, for example, as a threading or inserting lance, can additionally be equipped with a heating function, so that for example one or several heating lances are formed. Thermal or heating energy can thereby be provided in the allocated groove when the insertion aid is arranged there. It can be provided in this context that in particular the insulating material is heated by means of the heating energy. This insulating material, for example in the form of a paper material, can thus be adhered into the grooves from the inside. A "thermal activation" can be provided herein. In an further embodiment, the arrangement of threading lances can either be provided in the form of lances with the option of a "geometric expansion", but in particular in the form of lances with the option of a heating function, with the purpose of pressing the insulating papers, which had previously been inserted into the grooves, into the groove or of pressing them against the groove in the radial direction and/or in the circumferential direction. In this context, alternatively or in addition, it can be provided to plastically post-form and/or for example to heat up/to thermally activate the insulating material above, within and/or beneath the grooves, so that the insulating material, for example insulating papers, have a firm seat in the grooves, which can optionally not be changed any longer at least in the axial direction, after the removal of the heating insertion aids.

It can be provided that a material electrically insulating the coil elements in the grooves is held using the grip apparatus when inserting the coil elements into the grooves of the core. During insertion or threading of the legs of the coil elements, it can be provided in the grooves to surround the legs in the grooves with an insulating material, for example an insulating paper. The insulating material can be introduced prior to the insertion and/or optionally during the insertion of the legs of the coil elements in the grooves. In the case of this or other embodiments, it can be provided to secure the insulating material in the grooves with the help of the second grip device when the legs of the coil elements are inserted or threaded there, so as to avoid damages to or a slide-out of the insulating material. For example, the insulating material can have a collar on the top side of the core, thus on the side on which the legs of the coil elements are inserted into the grooves first, wherein the second grip device can bear on the core and can thereby clamp the collar, so as to fix the insulating material during the insertion or threading of the legs of the coil elements.

The grooves of the core can be provided so that the shape of their cross section is adapted to a cross section of the legs of the coil elements which are to be inserted, for example round or square.

Independently of a certain type of the gripping and holding of the arrangement of pre-positioned coil elements, a method for pre-positioning the coil elements can be provided, in which the rod-shaped or hairpin-shaped coil elements are inserted with one leg into an allocated receptacle, which can be formed, for example, in a tubular manner, on a pre-positioning unit, so as to then turn in several inserted coil elements at the same time (simultaneously), so as to produce the pre-positioned arrangement of coil elements in this way. Thereafter, the arrangement of coil elements can be received with the help of an arbitrary grip device, in particular the grip device described herein, and can be moved for insertion into the core. Arbitrary grip or transport devices can be used for this purpose in this case. For the simultaneous turning-in of the previously inserted coil elements, a guide plate can be used in which legs of the coil elements to be turned in are arranged radially on the outside in curved grooves or apertures, such that the legs located on the outside are turned in simultaneously and jointly by means of rotating the guide plate, whereby a basket-like arrangement of the coil elements can be produced, in which the coil elements are pre-positioned or pre-aligned. This method can be carried out independently of the grip device, which is then used to receive the arrangement of the pre-positioned coil elements.

In combination with the grip apparatus and the manufacturing apparatus, the above-described embodiments can be provided accordingly.

In connection with the grip apparatus, a distance between the first and the second grip device can be capable of being set, in particular in the vertical direction, for setting the distance between the first and the second grip plane.

In connection with the manufacturing apparatus, a centering apparatus can be provided, by means of which, during insertion or threading of the legs of the coil elements in the grooves of the core, the grip apparatus can be centered with respect thereto.

DESCRIPTION OF EXEMPLARY EMBODIMENTS

Further exemplary embodiments will be described in more detail below with reference to figures of a drawing, in which FIG. 1 shows a schematic perspective illustration of an arrangement comprising an apparatus for pre-positioning or pre-aligning coil elements for a plug-in coil of an electrodynamic machine;

FIG. 10 shows a schematic detail illustration with an arrangement of clamping or gripping jaws, by means of which legs of coil elements are gripped.

Figure 1:
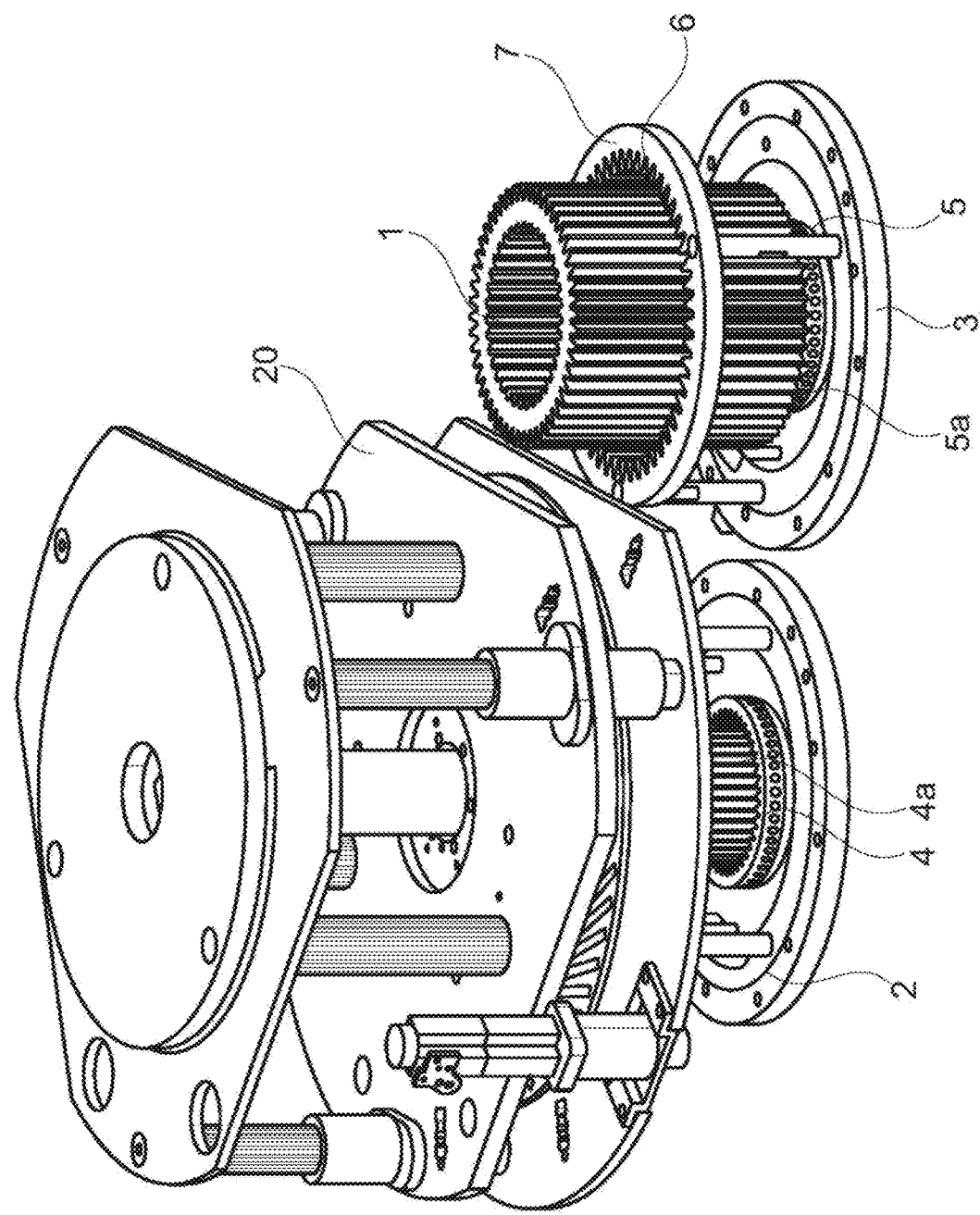

FIG. 1 shows a schematic perspective illustration of an apparatus for pre-aligning or pre-positioning coil elements 1, which are provided as rod-shaped or hairpin-shaped coil elements, for example comprising a U-shape. The embodiment shown in FIG. 1 is provided as a double station comprising a first and a second pre-positioning or pre-aligning unit 2, 3. The first and the second pre-positioning unit 2, 3 each have a circumferential arrangement of plug receptacles 4, 5, which are formed with tubular receptacles 4a, 5a. The coil elements 1 are each inserted into the receptacles 4, 5 with one leg. An opposite leg of the respective coil element is received in an allocated groove 6 of a guide plate 7, wherein the allocated groove 6 has a curved shape. To form an arrangement of pre-aligned or pre-positioned coil elements, the guide plate 7 is rotated, wherein the coil elements 1 tighten, so that a basked-like arrangement of the coil elements 1 is formed, in which the coil elements 1 are pre-positioned or pre-aligned.

The illustration in FIG. 1 shows a grip apparatus 20, by means of which the arrangement of pre-aligned or pre-positioned coil elements 1 can be received and displaced. FIGS. 2 to 9 show this in more detail. Herein, FIGS. 2 to 4 relate to the removal of the coil elements 1 after the pre-alignment or pre-positioning thereof. FIGS. 5 to 9 show the insertion or threading of legs of the coil elements 1 into grooves 21 of a core 22 for a plug-in coil of an electric or electrodynamic machine, either for a stator or a rotor.

Figure 2:
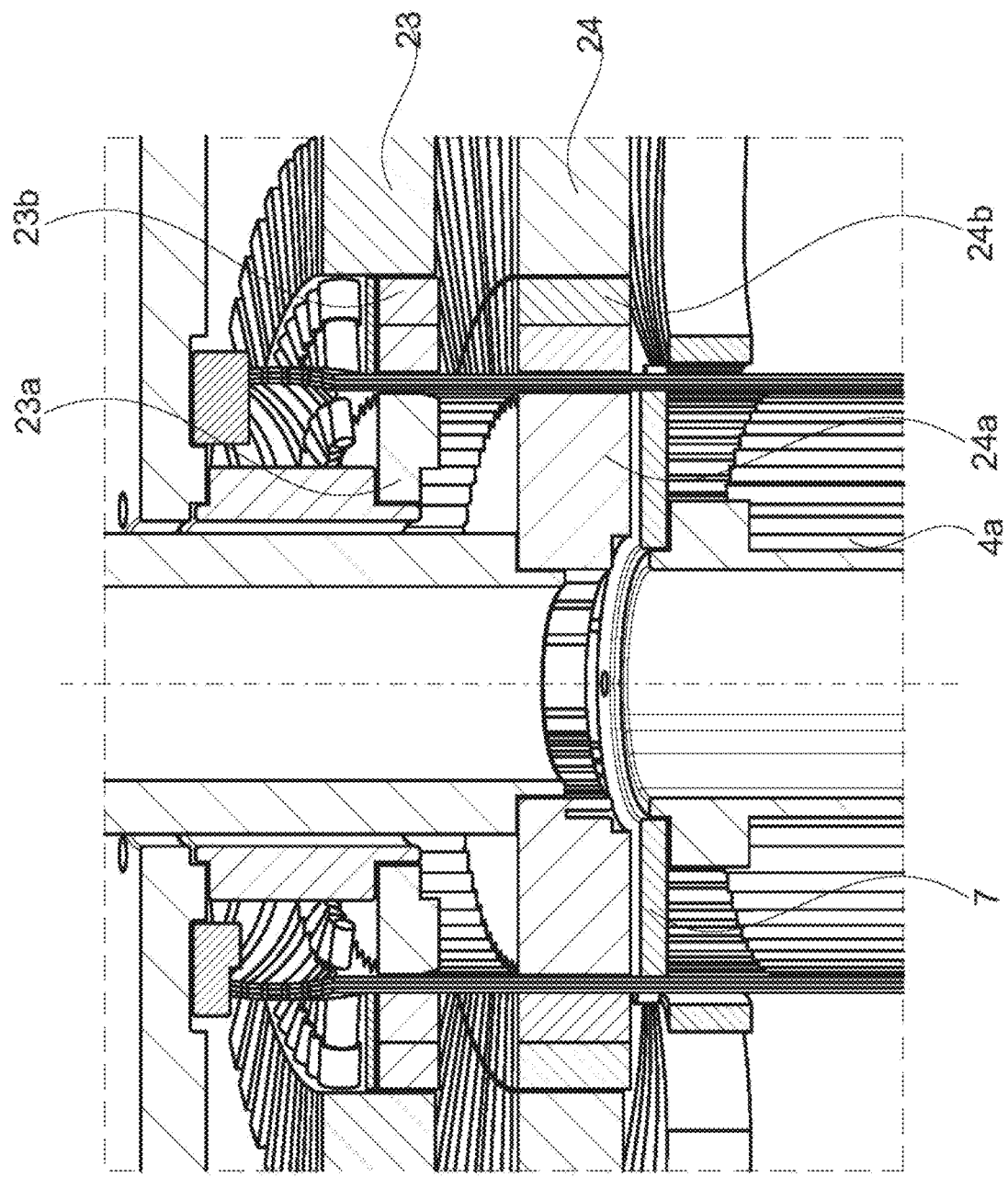
FIG. 2 shows a schematic detail illustration of the apparatus from FIG. 1 in section at the beginning of the receiving of an arrangement of pre-positioned or pre-aligned coil elements with the help of a grip apparatus.
Figure 3:
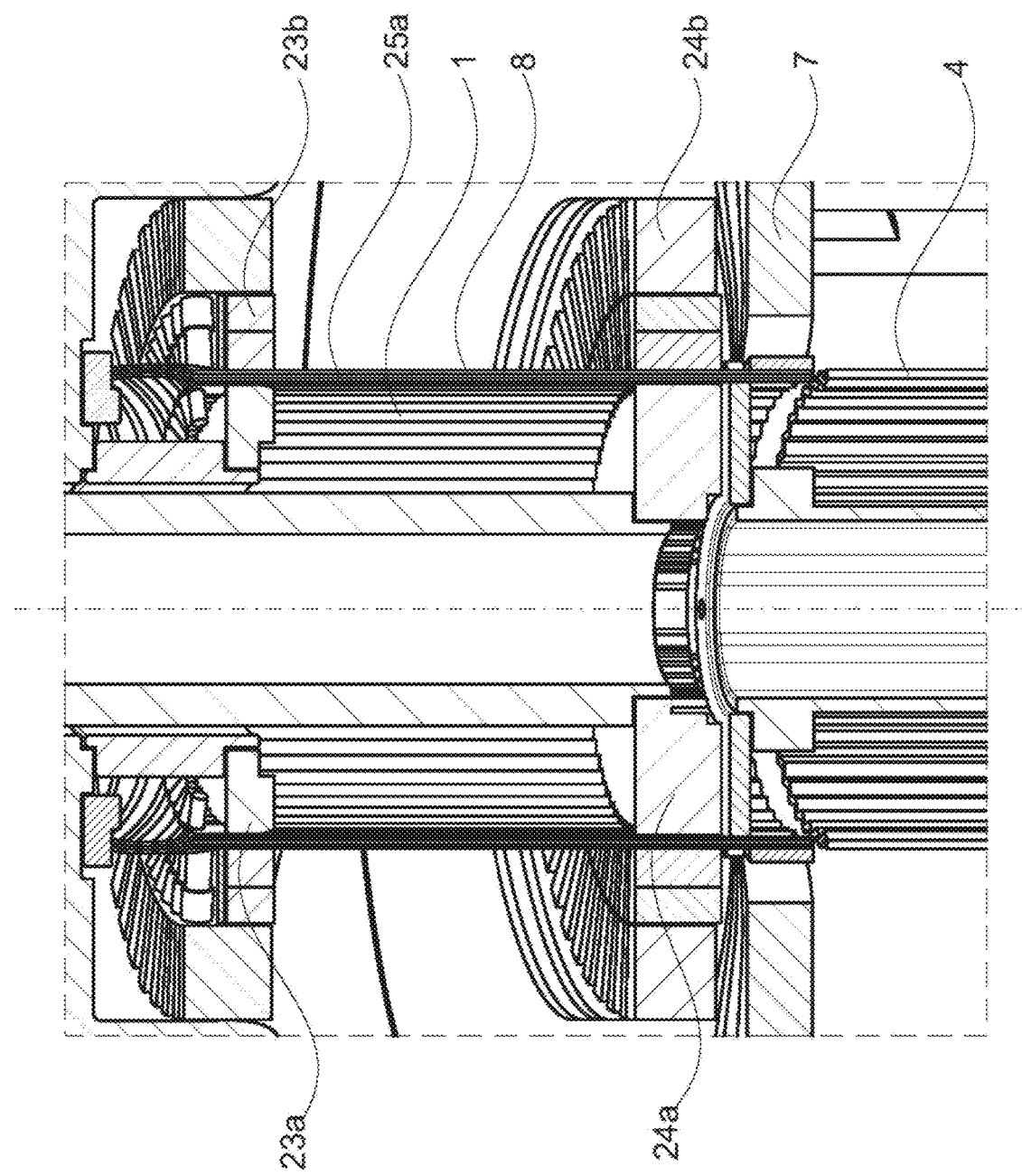
FIG. 3 shows a schematic detail illustration of the apparatus from FIG. 1 at a later point in time while removing the arrangement of pre-aligned coil elements.
Figure 4:
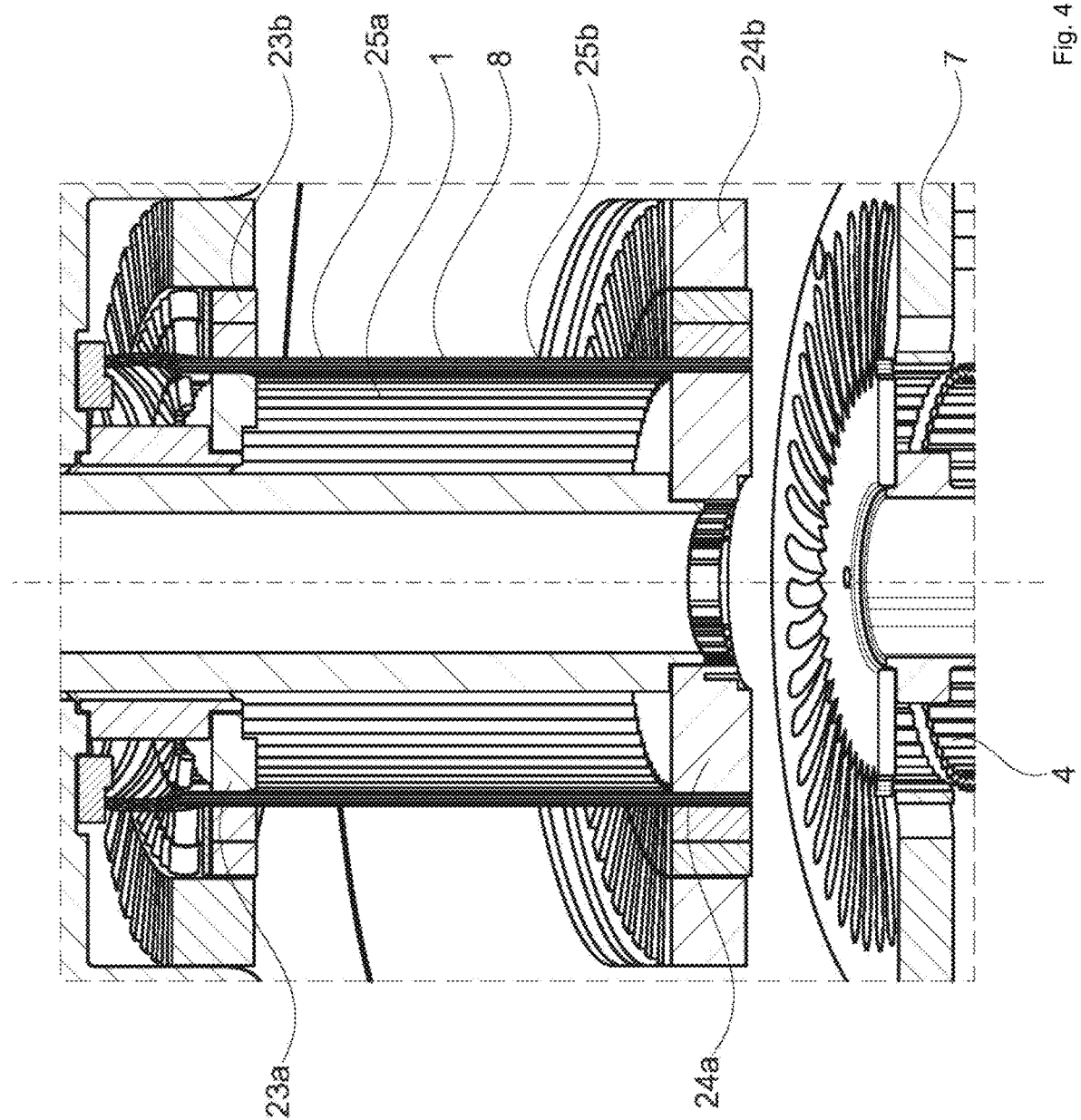
FIG. 4 shows a schematic illustration of the apparatus from FIG. 1 after the complete removal and gripping of the arrangement of pre-positioned coil elements.

According to FIGS. 2 to 4, the grip apparatus 20 has a first (upper) grip device 23 and a second (lower) grip device 24, which are each formed with inner and outer clamping or gripping elements 23a, 23b; 24a, 24b. To remove (unthread) the arrangement of coil elements 1, the latter is clamped or gripped, respectively, in an upper section 25a with the help of the first grip device 23, and is guided out of the receptacles 4, wherein the second grip device 24 does not clamp the coil elements 1 thereby, but guides them, whereby the pre-positioning or pre-alignment of the coil elements 1 is secured while being pulled out.

Figure 5:
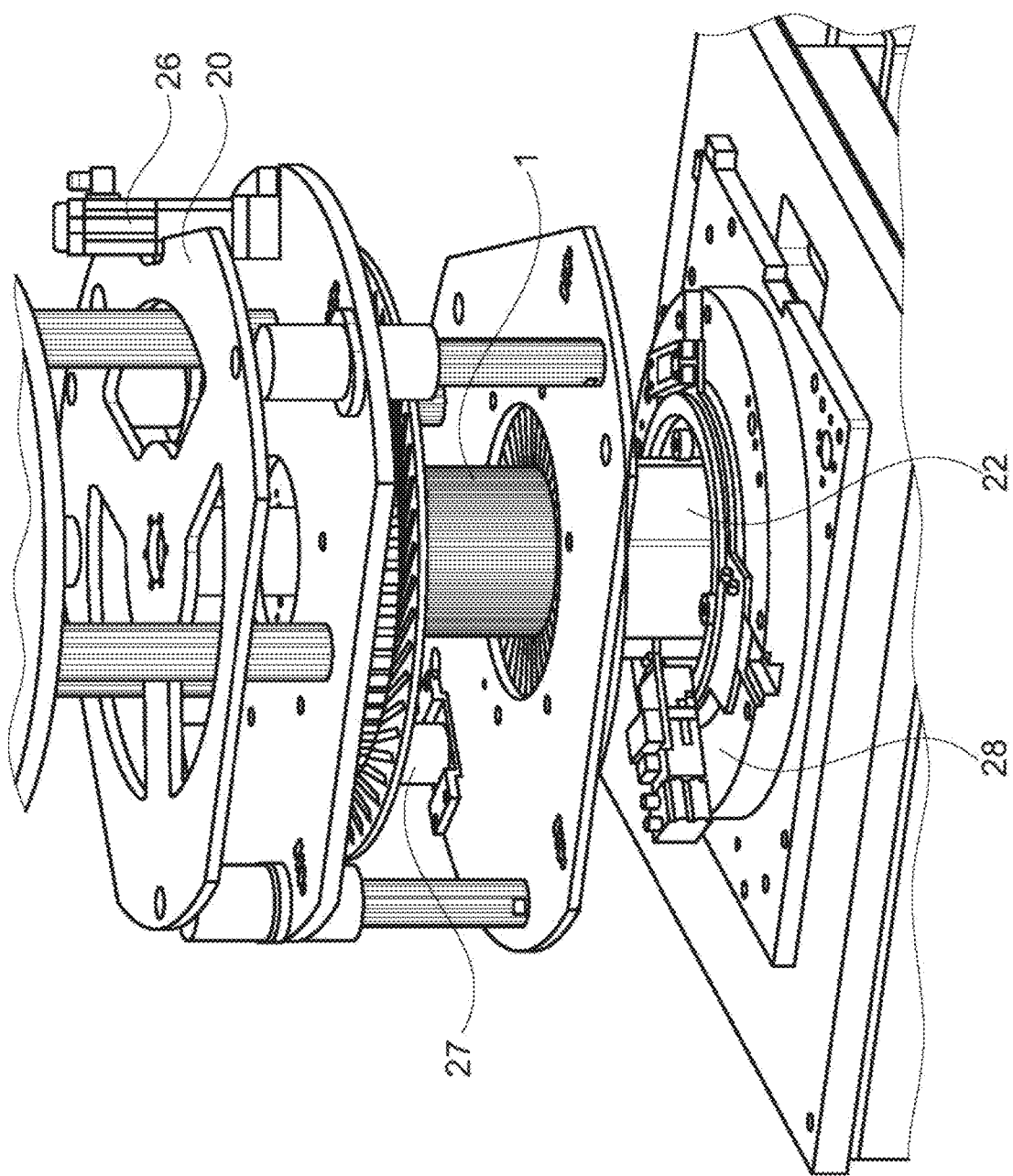
FIG. 5 shows a schematic perspective illustration of an apparatus for inserting or threading coil elements into grooves of a core for a plug-in coil of an electrodynamic machine.

According to the illustration in FIG. 4, the second grip device 24 is then located in the lower section 25b of legs 8 of the coil elements 1 and clamps them, so that the arrangement of coil elements 1 can be displaced away from the location of the pre-positioning or pre-alignment with the help of the grip apparatus 20 (see FIGS. 2 to 4), for example to the location of the insertion or threading of the coil elements 1 in the core 22, which is shown in FIG. 5 ff.

FIG. 5 shows a schematic perspective illustration of an apparatus for introducing the coil elements 1 in the grooves 21 of the core 20, wherein the arrangement of coil elements 1 is meanwhile held and guided by means of the grip apparatus 20.

Figure 6:
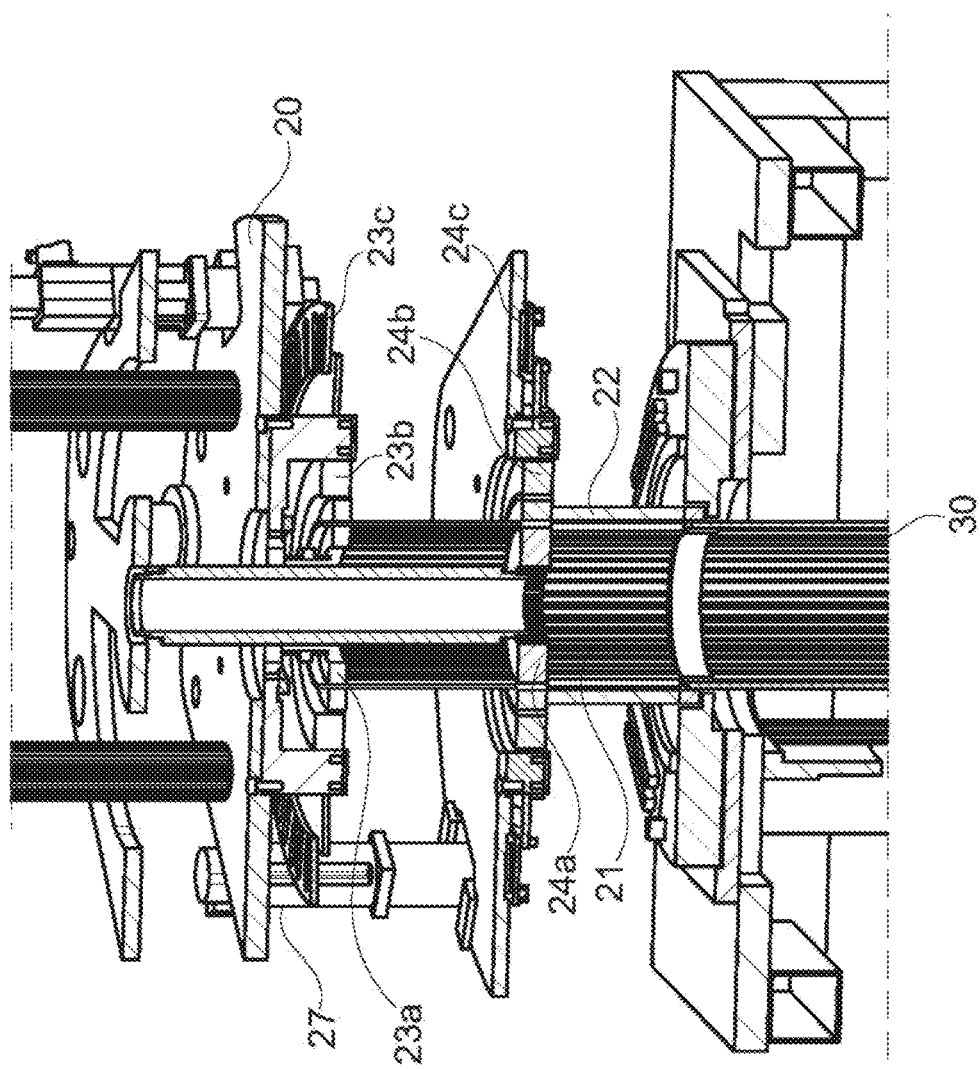
FIG. 6 shows a schematic perspective detail illustration of the apparatus from FIG. 5.

FIG. 6 shows a sectional illustration for the apparatus from FIG. 5. Servomotors 26, 27 serve to operate the clamping elements 23a, 23b; 24a, 24b. The core 22 is held with the help of a clamping device 28 for the insertion of the legs 8 of the coil elements 1. To synchronously drive the clamping or gripping elements 23a, 23b; 24a, 24b, respectively, a further guide plate 23c, 24c is in each case allocated to the first and the second grip device 23, 24.

An arrangement for insertion aids 30 is shown beneath the core 22, which, in the shown exemplary embodiment, are provided as insertion lances and are inserted into the grooves 21 of the core 21, so as to support the threading or insertion of legs 8 of the coil elements 1 from the top.

Figure 7:
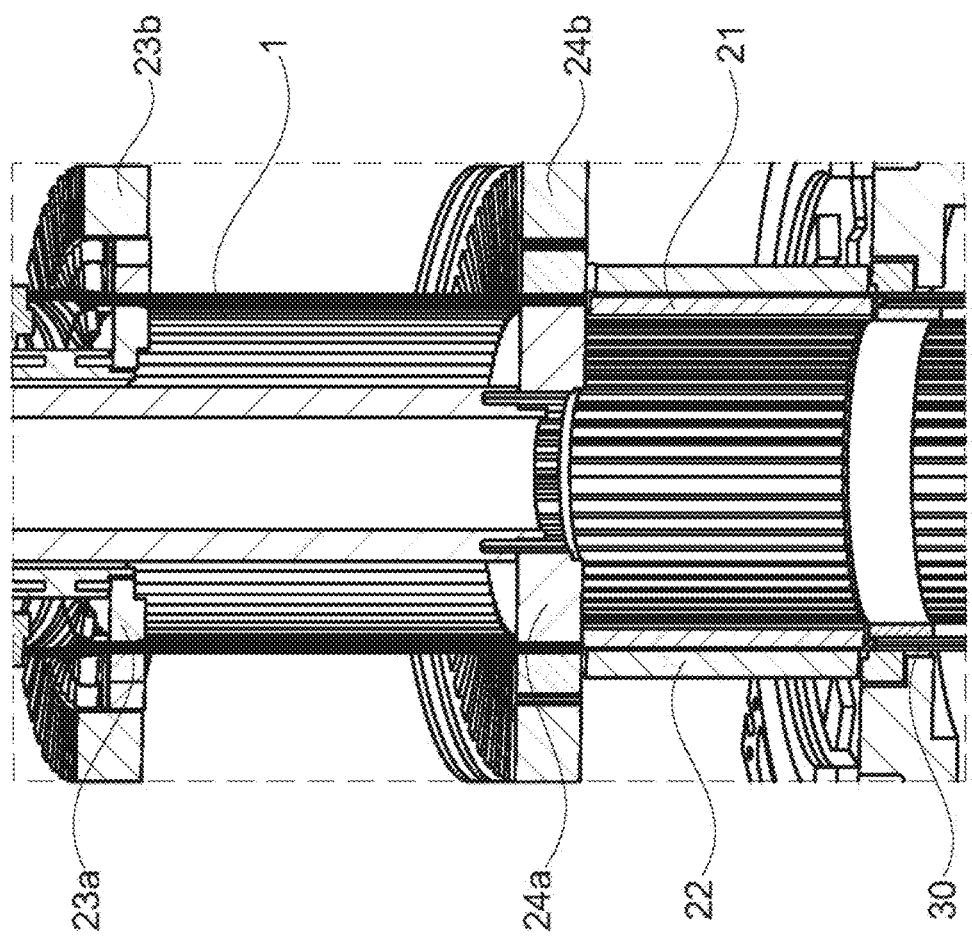
FIG. 7 shows a further schematic perspective detail illustration of the apparatus from FIG. 5.
Figure 8:
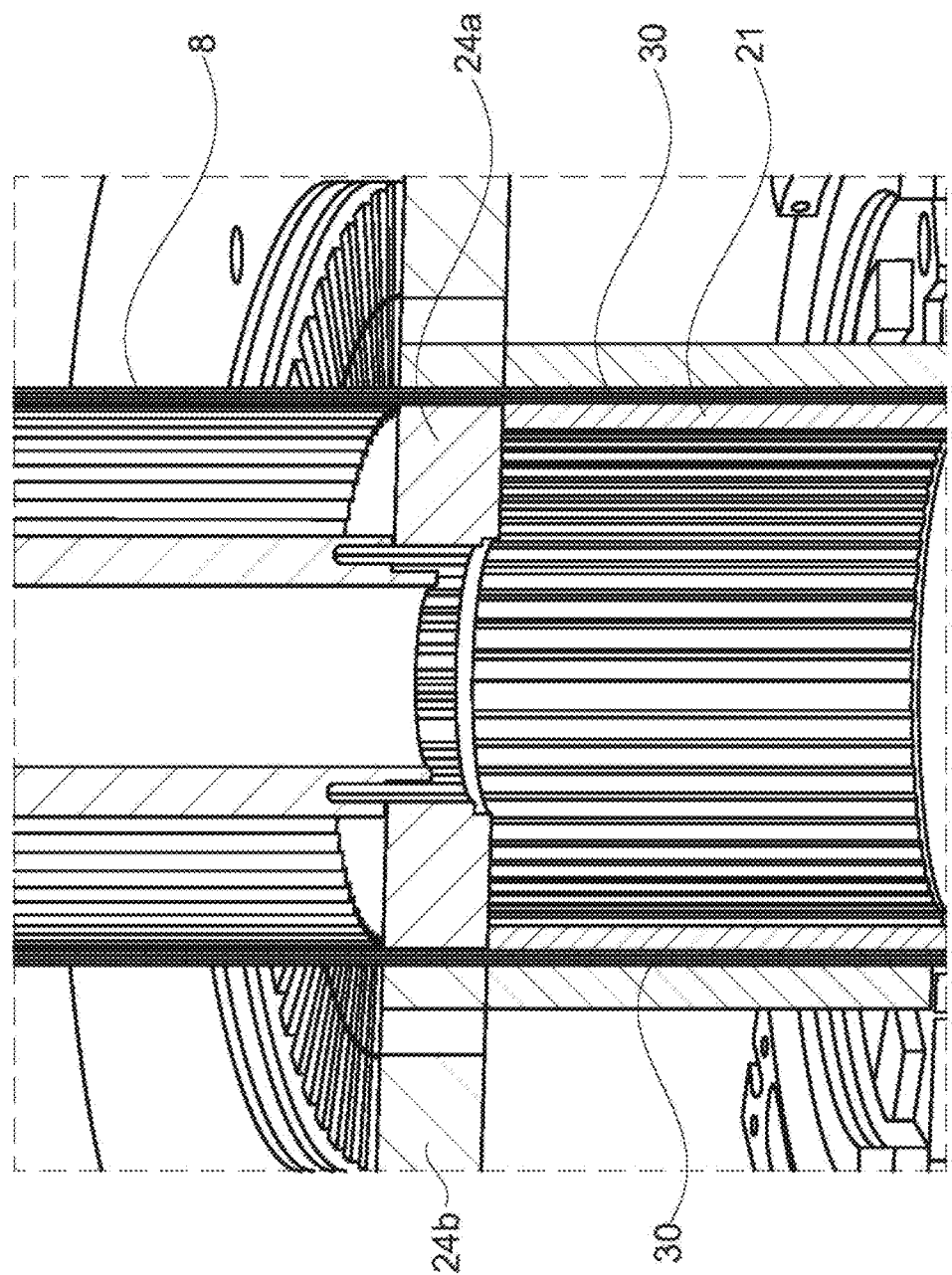
FIG. 8 shows another schematic perspective detail illustration of the apparatus from FIG. 5.
Figure 9:
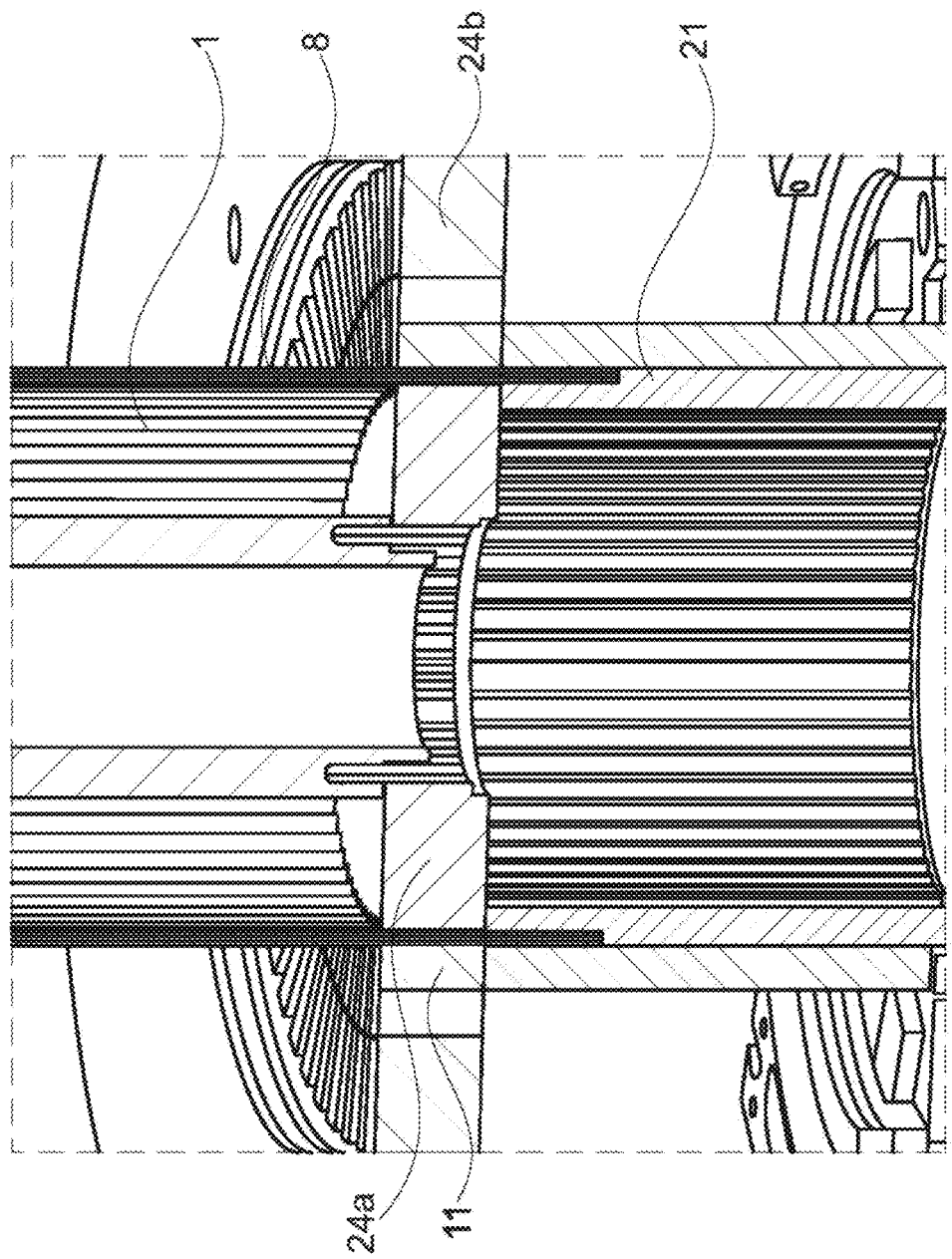
FIG. 9 shows a further schematic perspective illustration of the apparatus from FIG. 5

According to FIG. 7, the insertion aids 30 are initially arranged beneath the core 22. FIG. 8 then shows the insertion aids 30, which are inserted in the grooves 21, in the inserted state. During the subsequent threading or insertion of the legs 8 of the coil elements 1, the insertion aids 30 are moved back continuously or bit by bit (see FIG. 9), in particular synchronously for introducing or inserting in the legs 8, so that the legs 8 of the coil elements 1 are guided during the insertion into the grooves 21. Herein, the feed force is transferred to the coil elements 1 with the help of the first (upper) grip device 23, whereas the second grip device 24 does not clamp the legs 8 of the coil elements 1, but guides them, so as to maintain the pre-positioning or pre-alignment during the threading or insertion into the grooves 8.

FIG. 10 shows a schematic detail illustration with an arrangement of clamping or gripping jaws 40, . . . , 43, by means of which legs 8 of the coil elements 1 are gripped. An arrangement comprising three clamping or gripping jaws 40, . . . , 43 is shown. A clamping or gripping/holding jaw 40 located on the inside can be formed on a gearwheel 44, in such a way that a rigid bearing surface is provided, and comes to rest on a longitudinal side 45 of one of the legs 8. Clamping or gripping/holding jaws 41, 42, 43, which are embodied conically and comprising a step 46, engage with spaces 47 and come to rest on the legs 8 on narrow sides 48 as well as on an opposite longitudinal side 48.

The features disclosed in the above description, the claims, as well as the drawing, can be significant for the realization of the various embodiments, both alone and in any combination.

The invention claimed is:

1. A method for producing a package for a plug-in coil of an electric machine, comprising the following steps:
   providing a plurality of coil elements, which are each provided as a rod-shaped coil element and are pre-positioned relative to one another in a self-contained arrangement of coil elements;
   gripping the arrangement of coil elements by using a grip apparatus, wherein the grip apparatus grips the arrangement of coil elements using a first grip device in a first grip plane and a second grip device in a second grip plane, which is arranged beneath the first grip plane and is arranged spaced apart therefrom, wherein
   an initial grip distance between the first and the second grip plane is changed to a grip end distance which is greater than the initial grip distance;
   when changing the initial grip distance between the first and the second grip plane, the legs of the coil elements are clamped using the first grip device, and are guided in a non-clamping manner and so as to support pre-positioning relative to one another in the second grip device such that the pre-positioning of the coil elements in the arrangement is maintained and secured; and
   when the grip end distance is set, the legs of the coil elements are clamped using the second grip device;
   holding the arrangement of coil elements by means of the grip apparatus and inserting legs of the coil elements into allocated grooves of a core; and
   releasing the grip apparatus from the arrangement of coil elements, thereby yielding the package for the plug-in coil.

2. The method according to claim 1, wherein, during the insertion of the leg ends of the coil elements into the allocated apertures of the core,
   an initial insertion distance between the first and the second grip plane is changed to an insertion end distance, which is smaller than the initial insertion distance; and
   while the distance between the first and the second grip plane is changing, the legs of the coil elements are clamped using the first grip device and are guided in a non-clamping manner and so as to support the pre-positioning relative to one another in the second grip device.

3. The method according to claim 2, wherein, the grip apparatus is released from the arrangement of coil elements when the insertion end distance is reached.

4. The method according to claim 1, wherein the first and/or the second grip device hold the arrangement of the coil elements using clamping and/or grip elements, which, during gripping, are arranged on an outer and/or an inner side with respect to the arrangement of coil elements.

5. The method according to claim 1, wherein the first and/or the second grip device hold the arrangement of the coil elements by means of clamping and/or gripping elements, which are formed in a circumferentially continuous manner with respect to the arrangement of coil elements.

6. The method according to claim 1, wherein the first and/or the second grip device hold the arrangement of the coil elements by means of clamping and/or gripping elements, with respect to which sections of the arrangement of the coil elements are arranged in allocated receptacles of the clamping or gripping elements after the gripping/clamping.

7. The method according to claim 1, wherein the grip apparatus grips the arrangement of coil elements in such a way that the first grip plane and the second grip plane are arranged in the area of the legs of the coil elements.

8. The method according to claim 1, wherein the insertion of the coil elements into the grooves of the core is supported using allocated insertion aids, which are inserted into the grooves of the core.

9. The method according to claim 1, wherein a material electrically insulating the arrangement of the coil elements in the grooves is held using the grip apparatus when inserting the arrangement of the coil elements into the grooves of the core.

10. A grip apparatus for gripping and holding an arrangement of pre-positioned coil elements for a plug-in coil of an electric machine, comprising:
   a first grip device configured to grip in a first grip plane the arrangement of coil elements, which are each provided as a rod-shaped coil element and are pre-positioned relative to one another; and
   a second grip device configured to grip the arrangement of coil elements in a second grip plane, which is arranged beneath the first grip plane and spaced apart from the first grip plane;
   wherein the first and the second grip device are configured to hold the arrangement of coil elements and to insert legs of the coil elements into allocated grooves of a core.

11. The grip apparatus according to claim 10, wherein a distance between the first and the second grip device can be set for setting a distance between the first and the second grip plane.

12. A manufacturing apparatus for producing an arrangement for a plug-in coil of an electric machine, comprising:
   a pre-positioning unit which, to form an arrangement of coil elements, is configured to receive the coil elements for pre-positioning;
   an insertion unit configured to receive a core for inserting legs of the coil elements of the arrangement of coil elements into grooves of the core; and
   a grip apparatus according to claim 10 or 11 configured to remove the arrangement of coil elements from the pre-positioning unit, to pass the arrangement of coils elements to the insertion unit, and to hold and guide the arrangement of coil elements during insertion into the grooves of the core.

13. The manufacturing apparatus according to claim 12, further comprises a centering apparatus configured to center the grip apparatus during insertion of the legs of the coil elements into the grooves of the core with respect to the grooves of the core.

* * * * *